US008851422B2

(12) United States Patent
Dan-Jumbo (10) Patent No.: US 8,851,422 B2
(45) Date of Patent: Oct. 7, 2014

(54) BONDED COMPOSITE AIRCRAFT WING

(75) Inventor: Eugene Dan-Jumbo, Bothell, WA (US)

(73) Assignee: The Boeing Company, Chicago, IL (US)

( * ) Notice: Subject to any disclaimer, the term of this patent is extended or adjusted under 35 U.S.C. 154(b) by 197 days.

(21) Appl. No.: 13/596,989

(22) Filed: Aug. 28, 2012

(65) Prior Publication Data

US 2014/0061385 A1    Mar. 6, 2014

(51) Int. Cl.
| | | |
|---|---|---|
| B64C 3/26 | (2006.01) | |
| B64C 3/18 | (2006.01) | |
| B64C 3/20 | (2006.01) | |
| B64F 5/00 | (2006.01) | |
| B29C 70/88 | (2006.01) | |

(52) U.S. Cl.
CPC ... *B64C 3/20* (2013.01); *B64C 3/18* (2013.01); *Y02T 50/43* (2013.01); *Y02T 50/433* (2013.01); *B64C 3/26* (2013.01); *B64F 5/0009* (2013.01); *B29C 70/88* (2013.01)
USPC .................................. 244/123.1; 244/123.2

(58) Field of Classification Search
CPC ................ B64C 3/20; B64C 3/24; B64C 3/26
USPC ......................... 244/123.1–123.4, 123.7–124
See application file for complete search history.

(56) References Cited

U.S. PATENT DOCUMENTS

| | | | |
|---|---|---|---|
| 5,216,799 A | 6/1993 | Charnock et al. | |
| 6,217,000 B1* | 4/2001 | Younie et al. | 249/184 |
| 7,097,731 B2 | 8/2006 | Puriefoy et al. | |
| 2008/0277531 A1 | 11/2008 | Ackermann et al. | |
| 2011/0259514 A1* | 10/2011 | Boyle et al. | 156/276 |

OTHER PUBLICATIONS

O-Brien, "Interlaminar Fracture of Composites," Langley Research Center, NASA, Technical Memorandum 85768, Jun. 1984, 40 Pages.

* cited by examiner

*Primary Examiner* — Tien Dinh
*Assistant Examiner* — Nicholas McFall
(74) *Attorney, Agent, or Firm* — Yee & Associates, P.C.

(57) ABSTRACT

A unitized composite aircraft wing includes upper and lower composite laminate wing skins that have differing stiffnesses and are bonded to a composite grid structure. The grid structure includes grid spars extending in a span-wise direction, and cross beams extending in a chord-wise direction of the wing. The grid spars include caps bonded to the upper and lower wing skins.

21 Claims, 9 Drawing Sheets

BONDED COMPOSITE AIRCRAFT WING

BACKGROUND INFORMATION

1. Field

This disclosure generally relates to aircraft structures, and deals more particularly with a bonded composite wing.

2. Background

Fiber-reinforced resins, commonly referred to as "composites", are being used more frequently in the aerospace structures because of their relatively high strength-to-weight ratios, good corrosion resistance, and other beneficial properties. Conventional composites used in aerospace applications include glass, carbon, or polyaramid fibers in woven and non-woven configurations, held in a resin matrix resin such as epoxy. Plies of the composite are laid up over tools and then cured through application of a combination of heat and pressure to form a hardened laminate. In some cases, a core material such as a foam or a honeycomb is placed between the plies to form a composite sandwich.

In large commercial aircraft, composites are frequently employed in secondary structures but their use has been limited in primary structures such as wings which are manufactured predominantly from metals such as aluminum, titanium, etc. For example, some recent aircraft have used composite wing skins that are attached to metal structural spars and chords with metal fasteners. The metal fasteners add undesired weight to the aircraft and are subject to corrosion. Current wing designs also have other disadvantages. For example, current wings are not easily tailored to optimize a combination of flight characteristics such as lift, stiffness, bending, torsion, and discrete damage containment/arrestment. Additionally, current wing designs may employ many spars and/or chords that are heavier than desired, or which may not be optimized to transfer loads from the wing skins.

Accordingly, there is a need for a composite wing structure that substantially eliminates the need for metal fasteners and which exhibits improved discrete damage containment. There is also a need for an all-bonded composite wing structure having upper and lower composite skins of differing interlaminar fracture toughnesses and stiffness that are tailored to optimize flight characteristics, service life durability and fail-safe reliability.

SUMMARY

The disclosed embodiments provide a unitized composite wing structure having upper and lower tailored composite wing skins that are bonded to an underlying, all composite specially tailored wing-grid design structure. The upper and lower wing skins have different interlaminar fracture toughnesses in modes I, II and III respectively, as well as different stiffnesses and constitutive elastic constants. The disclosed wing structure exhibits improved aerodynamic performance, bonded joint durability and damage tolerance capability, as well as better load transfer efficiency. The use of an all-bonded wing structure design results in a very high stiffness-to-weight ratio, and permits more vertical wing deflection, while better reacting in-plane shear loads as well as torsional loads. The all-composite wing structure has a predictable, failsafe service life that may enable it to meet airworthiness requirements of regulating authorities. The upper and lower wing skins may be tailored to satisfy differing load requirements for a particular application, as well as to provide higher lift, maneuver loads up and down, bending, shear and torsional loads, lateral gusts, engine thrust and large, out of plane discrete engine burst damage. Tailoring the wing skins in this manner also distributes loads over the wings more efficiently, producing greater lift.

The wing skins are attached to the underlying wing-grid structure in a secondary bonding operation using adhesively bonded joints that reduce interlaminar singular peel and shear stress at the bonded joint boundaries. The bonded joints unitize the wing-grid structure substantially throughout the length of the wing, thereby mitigating torsional loads, reducing bending due to turbulence and assisting in containing localized discrete damage, such as that may be caused by an engine explosion. The use of a composite wing-grid structure bonded to composite wing skins eliminates the need for structural chord webs and may minimize the number of spars and longitudinal straps normally required in conventional wing designs, thereby reducing the weight of the wing. The integrated wing-grid structure may include high modulus reinforcement fibers, which in one embodiment, may be in the range of approximately 30 Msi.

The disclosed all-bonded composite wing construction substantially eliminates the need for metal fasteners to attach the wing skins to an underlying wing support structure. Elimination of metal fasteners presents a number of advantages. For example, stress concentrations in the wing skins around fasteners are eliminated and loads are more efficiently distributed over the wing. The elimination of metal fasteners reduces drag by increasing the smoothness of aerodynamic surfaces, eliminates possible metal corrosion, and increases overall joint interface strength. The use of a bonded, rather than fastened joints reduces the structural weight of the wing, thereby improving operating efficiencies, including reduced fuel consumption. The disclosed all composite, bonded wing structure may also reduce manufacturing costs.

In one embodiment of the bonded wing assembly, the compression loaded and bonded upper wing skin may have an interlaminar fracture toughness in Mode I of about 3.0 in-lbs/$in^2$ to about 5.0 in-lbs/$in^2$, in Mode II of about 4.5 in-lbs/$in^2$ to about 7.0 in-lbs/$in^2$, and in Mode III of about 7.5 in-lbs/$in^2$ to about 8.0 in-lbs/$in^2$. Such a configuration provides structural properties to retard any large cracks and the ability to react to different wing flight loads due to independent structural composite bending, torsion, and stiffness capability, thus increasing the vertical lift of the wing. The lower wing skin may be integrally bonded to lower beefy I-beam caps, and in one embodiment, may have an interlaminar fracture toughness in Mode I of about 4.5 in-lbs/$in^2$ to about 6.5 in-lbs/$in^2$, in Mode II of about 5.5 in-lbs/$in^2$ to about 8.0 in-lbs/$in^2$, and in Mode III of about 8.5 in-lbs/$in^2$ to about 12.0 in-lbs/$in^2$. Tailoring the mixtures of interlaminar fracture toughnesses for the upper and lower wing skins in Modes I, II and III provides the wing structure with unique characteristics that better react bending, shear and torque loads, leading to an increase in vertical wing deflection and an increase in vertical lift.

The grid cross-beams which form part of the wing-grid structure have the capability to react loads independently, thereby spreading out the wing torsion and bending loads during flight. The grid cross-beams, in one embodiment, may have an average interlaminar fracture of about 2.0 in-lbs/$in^2$ to about 3.0 in-lbs/$in^2$, which reinforces joint rigidity, resulting in more uniform distribution of peel stresses and in-plane sharer stresses within the wing joint. The upper and lower wing-skins may be bonded to the wing-grid structure and have unique properties such that they act independently as a fail-safe mechanism for either a longitudinal or a transverse crack. The wing-grid structure is suited for most wing and fuselage flight load conditions, including without limitation, bending moments, torsion, or skin in-plane shear stresses in the wing-grid interface structure due to fuel loads, including up and down bending due to lateral gusts or loads experienced during maneuvers. The stress singularities that may sometime develop within a bond line crack at the joints may be reduced with an adhesive taper wrap at the edges of the bonded joints. The bonded wing assembly is a structurally efficient fail-safe damage tolerant composite bonded design that may be certified by regulatory authorities to different load cases beyond 150% of limit to meet airworthiness requirements.

According to one disclosed embodiment, an aircraft wing comprises upper and lower composite wing skins respectively having differing stiffnesses, and a wing-grid structure located between and attached to each of the upper and lower wing skins. The wing-grid structure includes a plurality of intersecting composite support members bonded together. The composite support members include wing-grid spars extending in a span-wise direction of the wing and bonded to each of the upper and lower composite wing skins, and the upper and lower composite wing skins and the wing-grid structure form a unitized bonded wing structure. The upper composite wing skin has a stiffness less than the stiffness of the lower composite wing skin.

Each of the upper and lower wing skins is orthotropic and has an interlaminar fracture toughness. The interlaminar fracture toughness of the upper composite wing skin is less than the interlaminar fracture toughness of the lower composite wing skin. The composite support members include a plurality of composite wing-grid spars extending in a span-wise direction of the wing, and a plurality of composite grid cross beams bonded to the wing-grid spars and extending in a chord-wise direction of the wing. Each of the wing-grid spars includes a pair of spar caps and a spar web connected between the spar caps, and the grid cross beams include cross beam webs coupled with the grid spar webs. The composite cross beams include a first set of substantially flat straps sandwiched between the wing-grid spars and the upper composite wing skin, and a second set of substantially flat straps sandwiched between the wing-grid spars and the lower composite wing skin.

According to another embodiment, a unitized composite aircraft wing, comprises an upper composite wing skin including multiple laminate plies of fiber reinforced resin and having a first interlaminar fracture toughness, a lower composite wing skin including a plurality of laminated plies of fiber reinforced resin and having a second interlaminar fracture toughness that is greater in magnitude than the first interlaminar fracture toughness, and a composite grid structure sandwiched between and bonded to each of the upper and lower composite wing skins, the composite grid structure including a plurality of composite wing-grid spars extending in a span-wise direction of the wing, and a plurality of composite grid cross beams cocured with the wing-grid spars and extending in a chord-wise direction of the wing, wherein the composite wing-grid spars are bonded to the upper and lower composite wing skins to form a unitized wing structure. Each of the wing-grid spars includes an I-beam having an upper cap bonded to the upper composite wing skin, a lower cap bonded to the lower composite wing skin and a web connecting the upper and lower caps.

The upper composite wing skin has a Mode I interlaminar fracture toughness of between approximately 3.0 in-lbs/in$^2$ and approximately 5.0 in-lbs/in$^2$, and the lower composite wing skin has a Mode I interlaminar fracture toughness between approximately 4.5 in-lbs/in$^2$ and approximately 6.5 in-lbs/in$^2$. Each of the wing-grid spars has a grid spar web, each of the grid cross beams has a cross beam web, and the grid spar webs are connected to the cross beam webs. Each of the wing-grid spars includes a central web, upper and lower caps respectively on opposite ends of the central web, side webs spaced from and extending generally parallel to the central web, and a center stiffener connected to the central web and extending between the side webs. The center stiffener extends between and structurally connects the grid spars. The grid cross beams include first and second sets of substantially flat composite straps respectively sandwiched between the wing-grid spars and the upper and lower composite wing skins.

According to still another embodiment, a method is provided of making an aircraft wing structure. The method comprises forming upper and lower composite laminate wing skins respectively having differing stiffnesses, forming a composite inner wing-grid structure, and bonding the wing-grid structure to the upper and lower composite wing skins. Forming the wing-grid structure may include forming a plurality of composite wing-grid spars, forming a plurality of composite grid cross beams, and bonding the composite wing-grid spars to the composite grid cross beams. Forming the upper and lower composite wing skins includes selecting at least one material characteristic that results in the upper composite skin having an interlaminar fracture toughness that is less than the interlaminar fracture toughness of the lower composite skin. The material characteristic may be selected from the group consisting of fiber orientation, fiber material, fiber diameter, fiber density, resin material, and the number of plies having a fiber orientation of 0°.

The features, functions, and advantages that have been discussed can be achieved independently in various embodiments or may be combined in yet other embodiments further details of which can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present disclosure when read in conjunction with the accompanying drawings, wherein:

DETAILED DESCRIPTION

The embodiments of the aircraft wing structure described below utilize wing skin-grid differential features to improve wing-fuselage structural performance, and reduce manufacturing costs through lighter weight bonded designs. The disclosed wing structure may also reduce part count, may reduce or eliminate corrosion and may provide a higher structural margin of safety. The bonded aircraft wing structure exhibits increased wing design efficiency, is extremely light weight and provides fuel savings, while reducing or eliminates the need for fasteners to fasten the wing skins to the inner wing-grid and the spars. The wing structure has the ability to contain discrete damage, such as that caused by engine explosion.

In one exemplary embodiment, the bonded composite aircraft wing may include a composite inner wing-grid structure (hereinafter sometimes referred to as a wing-grid or wing-grid structure), and upper and lower composite wing skins that may be specifically tailored to satisfy different load cases, such as higher lift, loads during maneuvers, up and down bending, shear and torsional loads, lateral gusts, and engine thrust. The wing's fail-safe bonded inner wing-grid structure provides self-containment in the event of discrete damage and substantial reduction of the interlaminar singular peel and shear stress at intersections of wing-grid spars and grid cross beams which form the wing-grid structure. Adhesives may be used to bond the wing-grid spars and/or the grid cross-beams to upper and lower composite wing skins. The upper and lower wing skins may have differing interlaminar fracture toughnesses that include a graduated stiffness rigidity reacting wing loads. Unitized constant interface bonded properties throughout the wing-grid mitigate torsional loads and bending due to turbulence.

Figure 1:
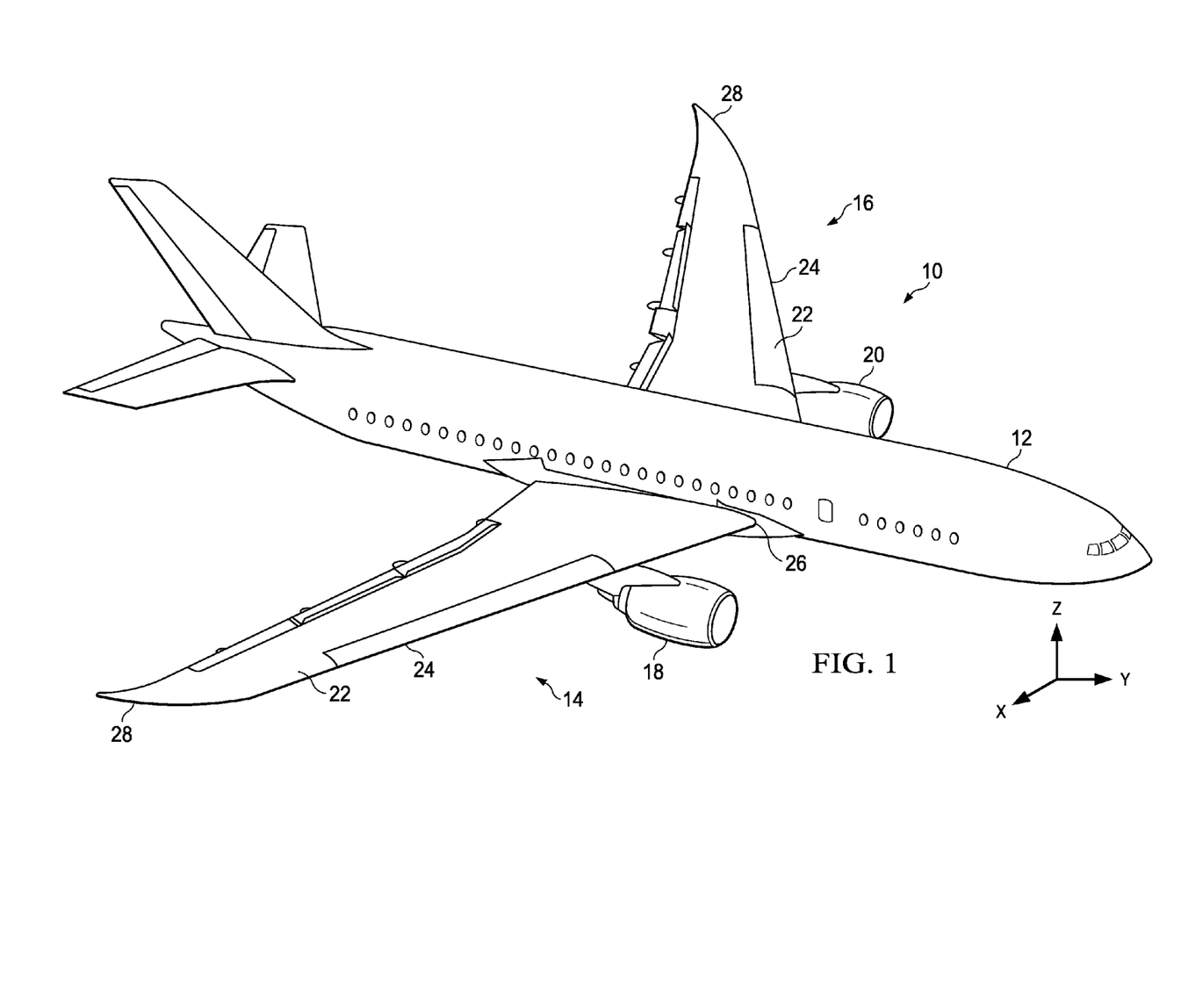
FIG. 1 is a perspective illustration of an aircraft.

Referring to the drawings, FIG. 1 is a perspective illustration of an exemplary aircraft 10 that includes a fuselage 12, wings 14 and 16 attached to fuselage 12, and engines 18 and 20 attached to wings 14 and 16 respectively. Each of the wings 14 and 16 has an upper composite laminate wing skin 22, lower composite laminate wing skin 24, a wing root 26 and a wing tip 28. As will be discussed below, each of the wings 14, 16 has an inner composite wing-grid structure (not shown in FIG. 1) which stiffens the wing 14, 16 and reacts loads applied to the upper and lower wing skins 22, 24 during flight.

Figure 2:
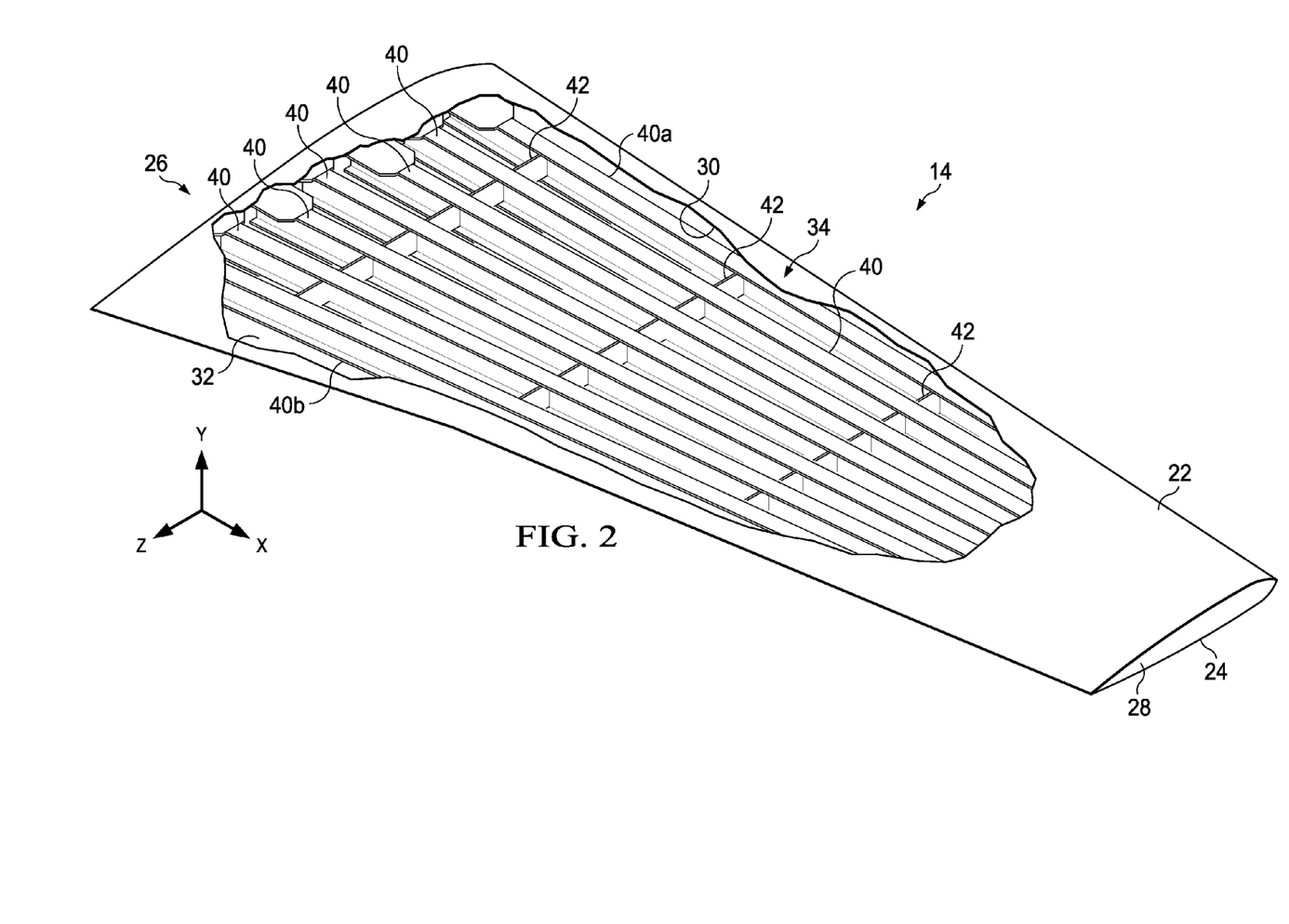
FIG. 2 is a perspective illustration of a portion of the right-side wing shown in FIG. 1, a portion of the upper wing skin removed to better reveal the inner wing-grid-structure.

FIG. 2 is a perspective illustration of one of the wings 14 shown in FIG. 1, a portion of the upper composite wing skin 22 being broken away to reveal an inner composite wing-grid structure 34 which will be described in more detail below. The composite wing-grid structure 34 comprises a grid of intersecting composite structural support members which may be cocured, which is bonded to the inner surfaces 30, 32 respectively of the upper and lower composite wing skins 22, 24 using a suitable adhesive which may be in film or paste form. Thus, the upper and lower wing skins 22, 24 are attached to the wing-grid structure 34 by bonded joints, thereby obviating the need for discrete fasteners. The wing-grid structure 34 comprises a plurality of wing-grid spars 40 extending in the span-wise or X-direction from wing root 26 to wing tip 28, and a plurality of intersecting composite support members, hereinafter referred to as grid cross beams 42, extending in the chord-wise or Y-direction, traverse to the wing-grid spars 40. The wing-grid spars 40, grid cross beams 42 and upper and lower skins 22, 24 may form a wing box that includes a leading edge grid spar 40a, and a trailing edge grid spar 40b to which leading and trailing edge assemblies (not shown) are respectively attached. In some embodiments, the leading and trailing edge grid spars 40a, 40b may be larger and/or stiffer that the other wing-grid spars 40 (sometimes referred to as mid-body spars) in order to transfer loads between the wing-box and the leading and trailing edge assemblies. The wing-grid spars 40 may be substantially uniform in cross section and other characteristics along their respective lengths.

The upper and lower composite wing skins 22, 24 respectively have differing interlaminar fracture toughnesses in Modes I, II and II respectively, resulting in the upper and lower wing skins 22, 24 having differing stiffnesses that are specifically tailored to meet both static and dynamic global loads of a particular aircraft application. The interlaminar fracture toughnesses of the upper and lower wing skins 22, 24 may be selected such that when the aircraft 10 is on the ground, the upper wing skin 22 is in tension and the lower wing skin 24 is in compression, but during flight, the upper and lower wing skins 22, 24 are respectively in compression and tension. Employing different interlaminar fracture toughnesses of composite wing skins 22 and 24 in combination with the composite wing-grid structure 34 better distributes wing loads during flight over a wider structural area, and may reduce or eliminate the need for structural chord webs typically used in traditional wing structures, while minimizing the number of spars required. Moreover, the use of upper and lower wing skins 22, 24 having differing interlaminar fracture toughnesses in combination with the wing-grid structure 34 better reacts a variety of forces applied to the wings 14, 16, including bending moments, torsion, shear stresses, up and down bending due to lateral gusts or maneuver loads during flight.

Each of the upper and lower composite wing skins 22, 24 respectively, is orthotropic and comprises a stack of laminated layers/plies of fiber-reinforced resin materials, such as carbon fiber epoxy, having relatively high strength-to-weight ratios. Each of the plies may comprise unidirectional reinforcing fibers of a desired angular orientation. For example, each of the wing skins 22, 24 may comprise multiple laminated plies respectively having fiber orientations of 0°, 45° and 90°. The 0° plies are generally oriented in the span-wise or X axis direction, while the 90° plies are oriented in the chord-wise or Y axis direction. The 45° plies included in the ply stack react in-plane, off angle loads and function to lower the Poisson's ratio effect.

Differing interlaminar fracture toughnesses of the upper and lower wing skins 22, 24 may be achieved by varying any one or more of several wing skin parameters, resulting in the upper and lower wing skins 22, 24 having differing stiffnesses. For example, although the ply schedule (stack) used to fabricate the upper and lower wing skins 22, 24 may both be orthotropic, the ply schedule used for the upper wing skin 22 may have fewer 0° plies than the ply schedule used for the lower wing skin 24, resulting in the upper wing skin 22 being less stiff and orthotropic than the lower wing skin 24. Alternatively, the desired difference in interlaminar fracture toughness of the upper and lower skins 22, 24 may be achieved by using a different resin, using a different fiber material, or using a different fiber diameter in the upper wing skin 22, compared to that used in the lower wing skin 24. Depending on the application, the ply schedules for the upper and lower wing skins 22, 24 may or may not vary layer-by-layer in either the span-wise or chord-wise directions. The use of wing skins 22, 24 having differing interlaminar fracture toughnesses and stiffnesses allows the bending, torsion and vertical deflection of the wings 14, 16 to be tailored in a manner that optimizes distribution of the wing lift, thereby increasing overall wing lift.

Upper composite wing skin 22 may have, in one typical embodiment, an interlaminar fracture toughness of about 3.0 in-lbs/in$^2$ to about 5.0 in-lbs/in$^2$ in Mode I, about 4.5 to about 7.0 in Mode II and about 7.5 to about 8.5 in Mode III. These ranges of interlaminar fracture toughness facilitate the wing's ability to react to different wing flight loads due to independent structural composite bending, torsion, and stiffness capability, while retarding or arresting the propagation of cracks. The lower composite wing skin 24 has a higher interlaminar fracture toughnesses than the upper wing skin 22. For example, the lower composite wing skin 24 may have an interlaminar fracture toughness of about 4.5 in-lbs/in$^2$ to about 6.5 in-lbs/in$^2$ in Mode I, 5.5 in-lbs/in$^2$ to about 8.0 in-lbs/in$^2$ in Mode II, and about 8.5 in-lbs/in$^2$ to about 12.0 in-lbs/in$^2$ in Mode III. These ranges of interlaminar fracture toughnesses provide the lower wing sin 24 with unique structural tension-shear-stiffness characteristics that better react to wing bending and torsion loads.

Upper composite wing skin 22 is formed with a lower interlaminar fracture toughness than lower composite wing skin 24 such that during flight, upward bending of the wing places the upper composite wing skin 22 in compression while the bottom wing skin 24 is in tension. In addition, the composite wing-grid structure 34 provides rigidity to upper and lower wing skins 22 and 24 during flight. In other embodiments, upper composite wing skin 22 may have an interlaminar fracture toughness of greater than or lower than 4.0 in-lbs/in$^2$, and lower composite wing skin 24 may have an interlaminar fracture toughness of greater than or lower than 6.0 in-lbs/in$^2$, where lower wing 24 has an interlaminar fracture toughness greater than the interlaminar fracture toughness of upper wing 22.

Structural composite stiffness properties are partly derived from high modulus fibers of advanced composite structural materials for upper and lower wing skins 22 and 24. High stiffness-to-strength ratio fibers in the structural resin reinforce high interlaminar toughness of the structural resin with specified structural properties in modes I, II & III critical wing load cases, respectively. The mode I property provides for load carrying capability of wings 14 and 16, while the mode II property provides for in-plane loads and for resisting damage of wings 14 and 16. The mode III property provides for twisting/torsional rigidity of wings 14 and 16.

Upper composite wing skin 22 structural properties have moderately high mode I and mode II interlaminar fracture toughness. The mode I structural property is designed to increase the load carrying capability of upper composite wing skin 22 under normal loads induced by bending, and compression induced during take-off and in flight. The mode II interlaminar toughness property for upper composite wing skin 22 is designed to take more in-plane shear loads due to bending and torsion, thus increasing the capability of the wing to sustain higher aerodynamic loads.

The structural composite properties of the lower composite wing skin 24 are designed to have higher mode I, II and III structural interlaminar toughnesses compared to the corresponding properties of the upper wing skin 22. These structural properties are selected to increase the capability to carry global heavy interlaminar tension and in-plane shear loads in lower composite wing skin 24 induced by up-bending. The mode III structural interlaminar toughness of the lower composite wing skin 24 is designed to increase the capability of the wing to react to the twisting moment at the thick inboard side of wings 14 and 16 due to heavy fuselage loads. Additionally, an increase in the mode III property, which is the twisting/torsional rigidity property, results in higher lift and produces a balanced twisting angle of the wing.

Figures 3, 4:
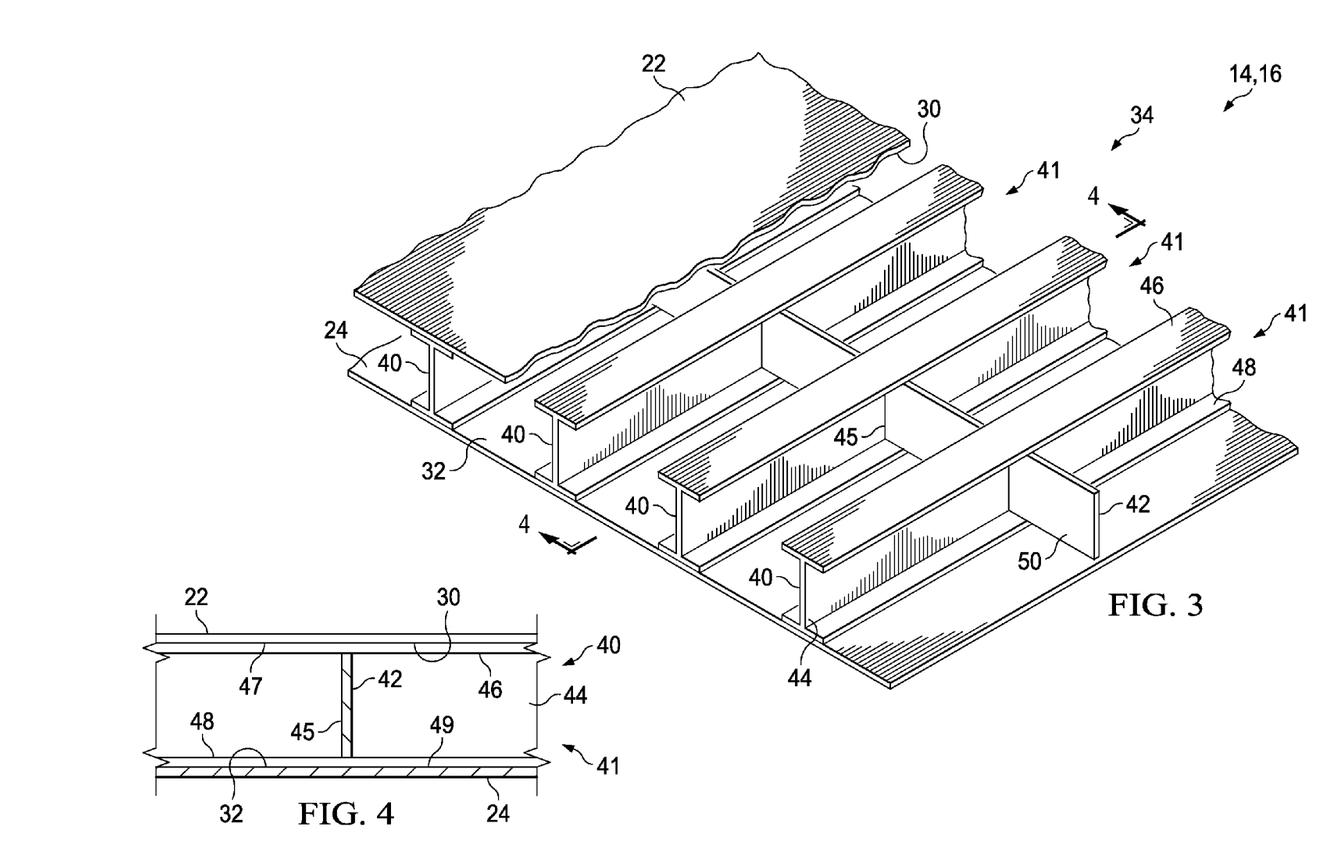
FIG. 3 is a perspective illustration of a portion of the wing shown in FIG. 1, a part of the upper wing skin broken away to reveal details of one embodiment of the inner wing-grid structure.
FIG. 4 is a sectional view taken along the line 4-4 in FIG. 3.

The wing-grid structure 34 discussed above may be implemented using any of a variety of composite structural configurations employing wing-grid spars 40 that are reinforced and/or are stabilized by grid cross beams 42. For example, referring to FIGS. 3 and 4, the wing-grid spars 40 may each comprise a composite I-beam 41 having an upper cap 46 and a lower cap 48 joined together by a web 44. The upper caps 46 are adhesively bonded to the inner surface 30 upper wing skin 22 along a bond line 47, and the lower caps 48 are adhesively bonded to the inner surface 32 of the lower wing skin 24 along a bond line 49. In this example, the grid cross beams 42 comprise individual, substantially flat composite webs 50 that extend between adjacent ones of the I-beams 41 and are adhesively bonded along bond lines 45 to be webs 44 of the wing-grid spars 40. In alternative embodiments, the I-beams 41 and the grid cross beam webs 50 may be laid up and co-cured.

Figures 5, 6:
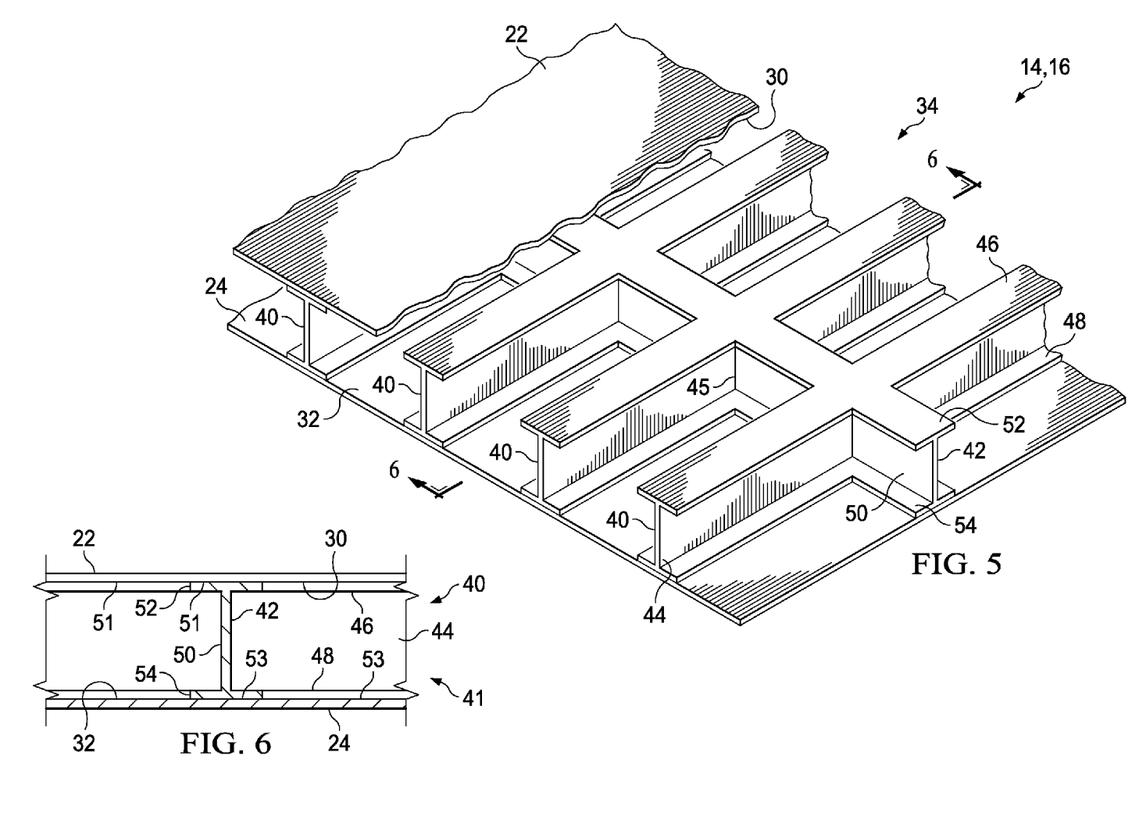
FIG. 5 is an illustration similar to FIG. 3 but showing an alternate form of the wing-grid structure.
FIG. 6 is a sectional view taken along the line 6-6 in FIG. 5.

Attention is now directed to FIGS. 5 and 6 which illustrate an alternate form of the wing-grid structure 34. In this example, the composite I-beams 41 forming the wing-grid spars 40 are reinforced and stabilized by grid cross beams 42 which are also I-shaped in cross section. Each of the grid cross beams 42 comprises upper and lower caps 52, 54 joined together by a web 50. The upper and lower caps 52, 54 respectively are substantially coplanar with the corresponding upper and lower caps 46, 48 of the wing-grid spars 40, thereby providing a larger bond area between the wing-grid structure 34 and the upper and lower wing skins 22, 24, compared to the embodiment shown in FIGS. 3 and 4. In some embodiments, the grid cross beams 42 may be laid up and co-cured with the wing-grid spars 40, while in other embodiments they may be adhesively joined together in a secondary bonding operation. The upper caps 46, 52 are adhesively bonded to the inner surface 30 of the upper wing skin 22 along a bond line 51 in a secondary bonding operation. Similarly, the lower caps 48, 54 are adhesively bonded to the inner surface 32 of the lower wing skin 24 along a bond line 53, also in a secondary bonding operation. In the example shown in FIGS. 5 and 6, the grid cross beams 42 are substantially aligned in the chord-wise direction of the wing 14, 16, however in other embodiments the grid cross beams 42 may be staggered or offset from each other in the span-wise direction of the wing 14, 16.

Figure 7:
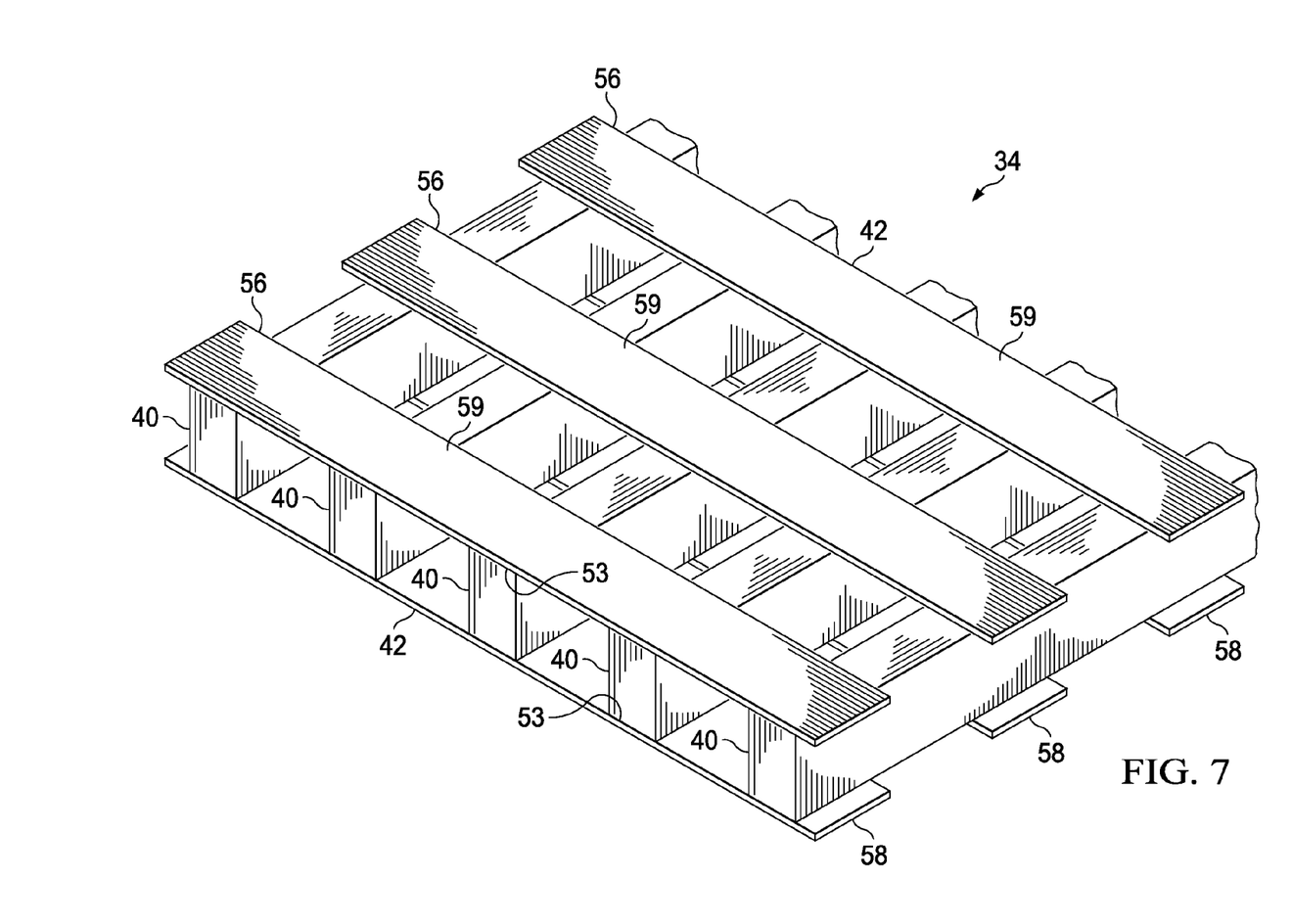
FIG. 7 is a perspective illustration of another form of the wing-grid structure, the wing skins not shown for clarity.

FIG. 7 illustrates still another embodiment of the wing-grid structure 34, the upper and lower composite wing skins 22, 24 not shown for clarity. The grid cross beams 42 comprise upper and lower, substantially flat, composite cross beam straps 56, 58 which may be longitudinally spaced apart in the span-wise direction of the wing 14, 16, and which extend transversely across the wing-grid spars 40. In the illustrated example, the wing-grid spars are only generically indicated by the numeral 40. The cross beam straps 56, 58 may be laid up over and cocured with the wing-grid spars 40. The cross beam straps 56, 58 have outer, flat bonding surfaces 59 to which the upper and lower wing skins 22, 24 may be adhesively bonded along bond lines 53 in a secondary bonding operation. Alternatively, the cross beam straps 56, 58 may be laid up over and cocured with the wing-grid spars 40.

Figures 8, 9:
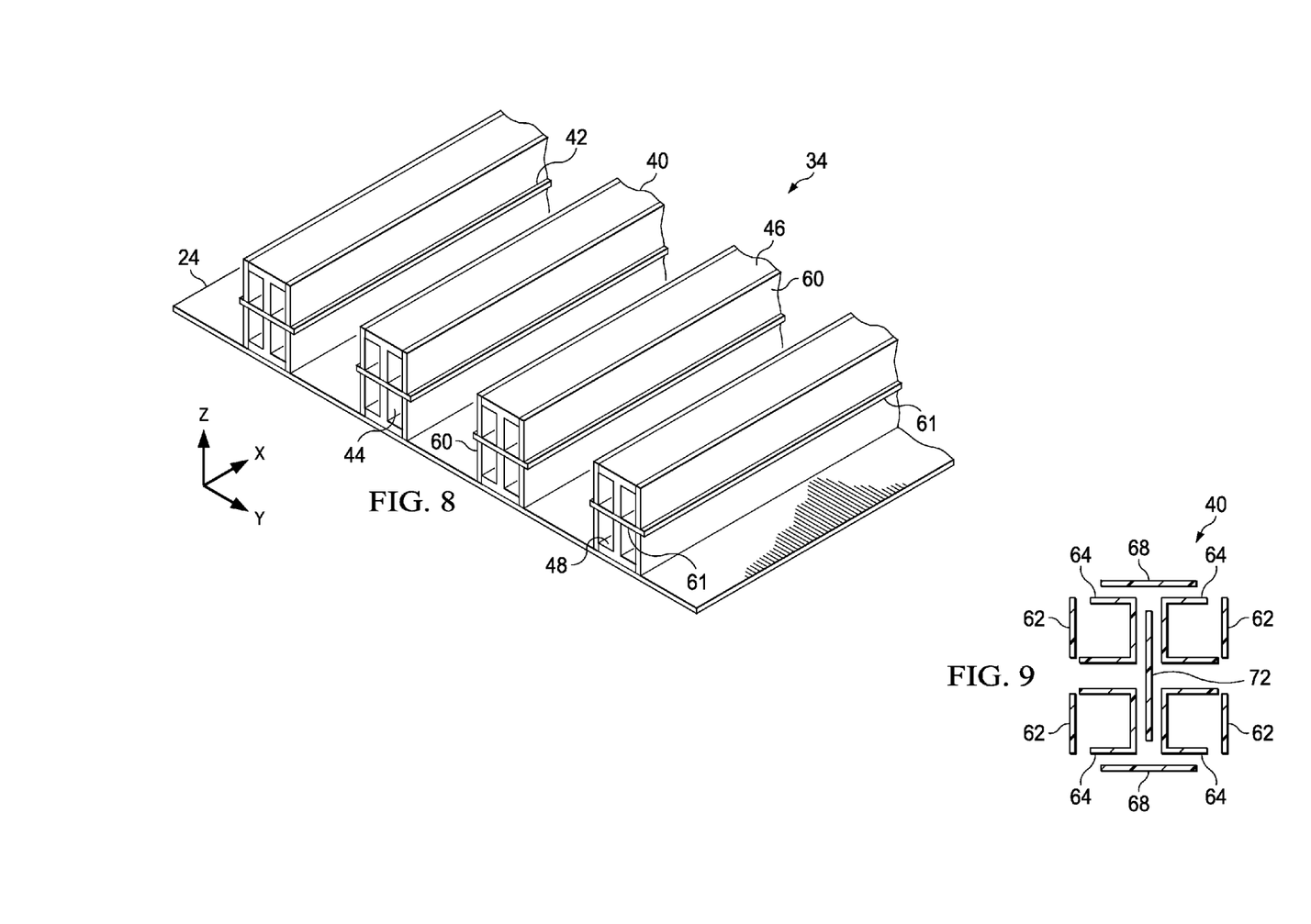
FIG. 8 is a perspective illustration of a portion of a wing employing another form of the wing-grid structure, the upper wing skin not shown for clarity.
FIG. 9 is a diagrammatic illustration showing how standard composite components may be combined to form the wing-grid structure shown in FIG. 8.

FIG. 8 illustrates yet another embodiment of the wing-grid structure 34 which employs I-beam type wing-grid spars 40, similar to the I-beams 41 previously discussed in connection with FIGS. 3-6. In this example, the I-beam shaped wing-grid spars 40 are further stiffened and stabilized by composite laminate side webs 60. In order to stiffen the wing-grid structure 34 in the chord-wise direction, each of the wing-grid spars 40 is provided with a center stiffener 61 extending in the X-Y plane. The center stiffeners 61 extend through the webs 44 and into the side webs 60, and function as the grid cross beams 42 previously described, to provide the wings 14, 16 with the desired torsional rigidity and shear strength. Similar to the embodiments shown in FIGS. 3-6, the upper and lower caps 46, 48 are bonded directly to the upper and lower wing skins 22, 24 respectively, resulting in transmission of loads through bond lines (not shown) between the wing skins 22, 24 and the wing-grid structure 34.

FIG. 9 illustrates one assembly that may be employed to fabricate the wing-grid structure 34 shown in FIG. 8, using simple pre-formed composite laminate segments. Four pre-formed C-shaped segments 64 are prepositioned against a center web segment 72. Side web segments 62, which form side webs 60 (FIG. 8), are then positioned over the outer sides of the C-shaped segments 64. Cap segments 68 are placed over the assembled C-shaped segments 64, thereby forming a layup assembly that comprises all of the elements of the wing-grid structure 34 shown in FIG. 8. The composite laminate segments shown in FIG. 9 are laid up in sequence and then co-cured.

Figure 10:
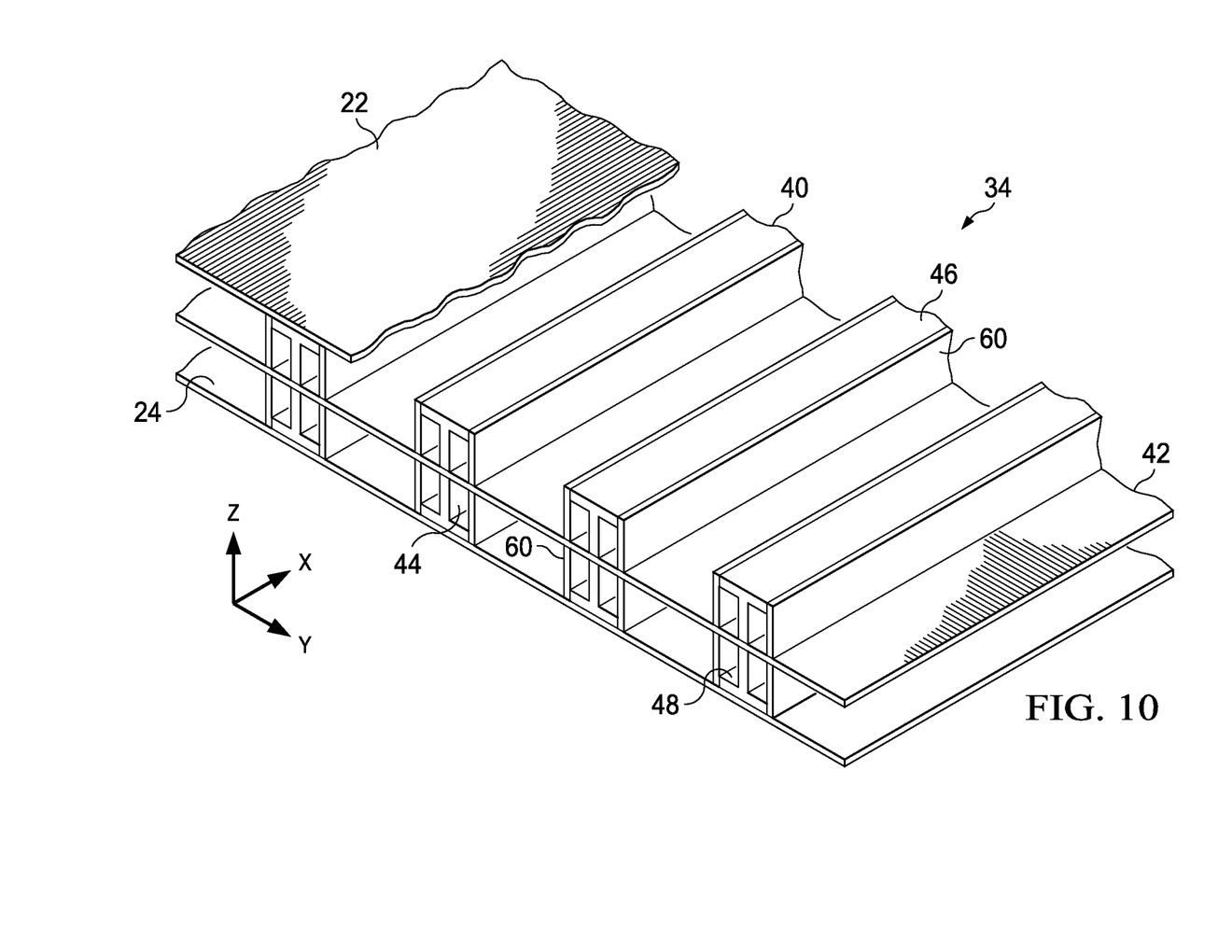
FIG. 10 is a perspective illustration similar to FIG. 8, but showing a further form of the wing-grid structure.

FIG. 10 illustrates another embodiment of the wing-grid structure 34, similar to that shown in FIG. 8, with the exception that the center stiffener 61 extends continuously in the chord-wise direction between the wing-grid spars 40, as well as continuously in the span-wise direction of the wing 14, 16. In some forms, the center stiffener 61 may have gaps therein between adjacent ones of the wing-grid spars in order to reduce wing weight. For example, the center stiffener may comprise a series of individual, spaced apart center stiffener straps that pass through the wing-grid spars 40.

Figure 11:
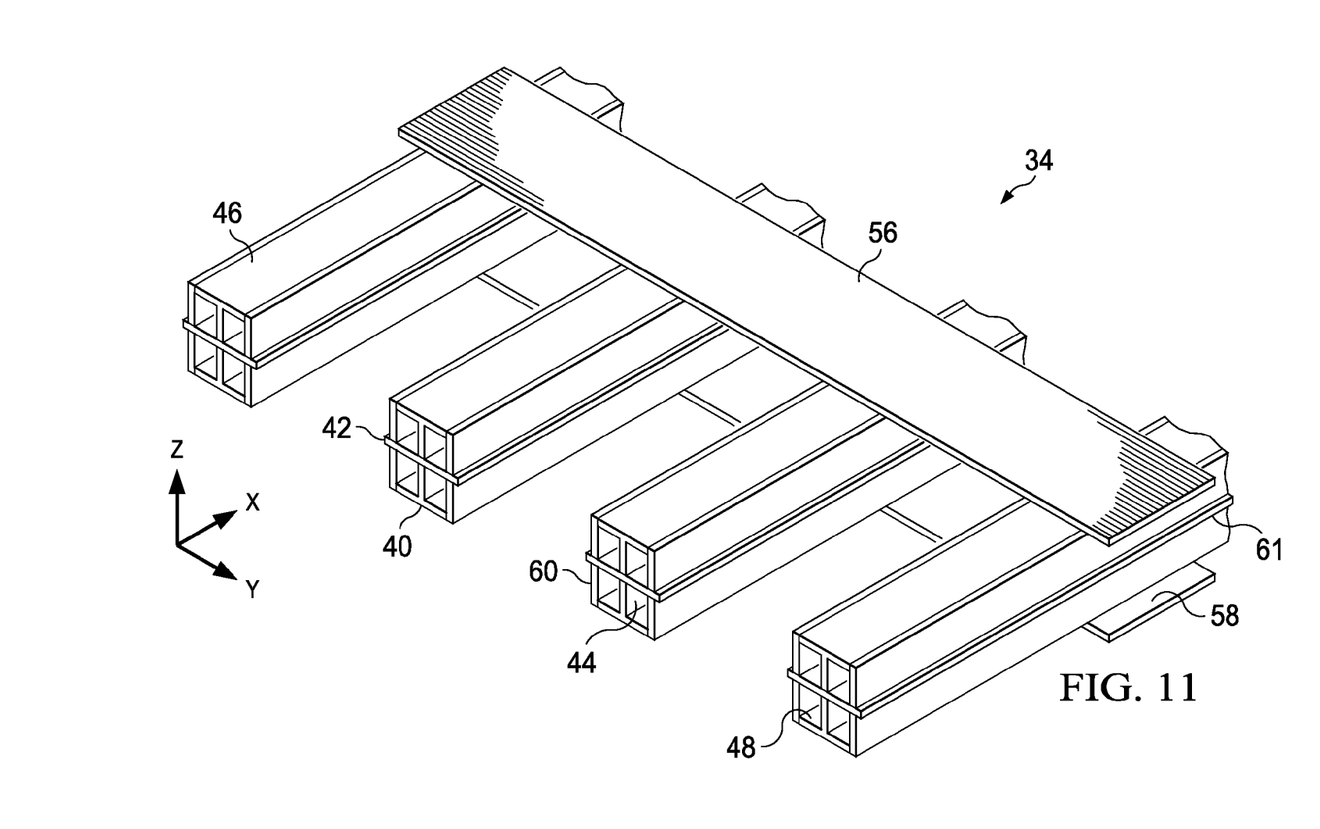
FIG. 11 is a perspective illustration of another form of the wing-grid structure employing cross beam straps, the wing skins not shown for clarity.

FIG. 11 illustrates another variation of the wing-grid structure 34 that combines features of the embodiments previously discussed in connection with FIGS. 7 and 8. In this embodiment, the grid cross beams 42 are formed by upper and lower cross beam straps 56, 58 which are bonded to or co-cured with the wing-grid spars 40. The upper and lower cross beam straps 56, 58 may be spaced apart in the span-wise direction, similar to the embodiment shown in FIG. 7, or may be continuous or semi-continuous in the span-wise direction of the wing 14, 16. The upper and lower cross beam straps 56, 58 may have a thickness sufficient to react transverse shear loads and bending in the chord-wise direction.

Figure 12:
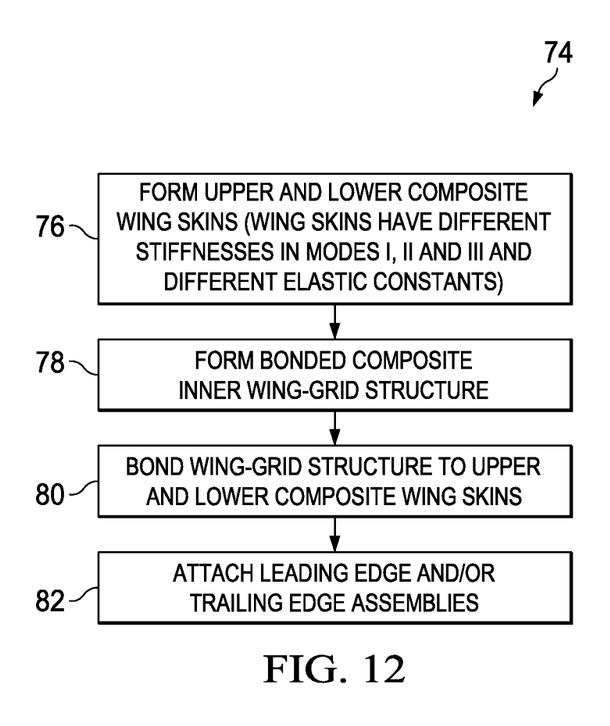
FIG. 12 is a block flow diagram of a method of making an aircraft wing.

FIG. 12 broadly illustrates the steps of a method 74 of making an aircraft wing 14, 16 of the type previously described. Beginning at step 76, upper and lower composite wing skins 22, 24 are formed which respectively have differing interlaminar fracture toughnesses and stiffnesses in Modes I, II and III, as well as different elastic constants. As previously mentioned, differing interlaminar fracture toughnesses and stiffnesses may be imparted to the wing skins 22, 24 by varying the one or more material characteristics, such as the number of plies having a particular ply orientation, such as 0° plies, in the skin. Following ply layup of each of the wing skins 22, 24, they are each cured. At step 78, an inner wing-grid structure 34 is formed by laying up the elements comprising the wing-grid spars 40 and the grid cross beams 42 previously discussed, using suitable layup and assembly tooling. Following layup, the wing-grid spars 40 and the grid cross beams 42 are co-cured together to form a fully consolidated and integrated wing-grid structure 34. At step 80, the pre-cured upper and lower composite wing skins 22, 24 are adhesively bonded to the pre-cured wing grid structure 34, in a secondary bonding operation, to form a completed wing box. At step 82, leading edge and/or trailing edge assemblies may be attached to the wing box, as desired.

This written description uses examples to disclose the invention, including the best mode, and also to enable any person skilled in the art to practice the invention, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An aircraft wing, comprising:
an upper composite wing skin and a lower composite wing skin each skin comprising differing stiffnesses from the other skin; and
a wing-grid structure located between and attached to each of the upper and lower wing skins, the wing-grid structure comprising a plurality of intersecting composite support members bonded together, the composite support members comprising:
a plurality of composite wing-grid spars extending in a span-wise direction of the wing, and
a plurality of composite grid cross beams bonded to the wing-grid spars and extending in a chord-wise direction of the wing, the composite cross beams comprising:
a first set of substantially flat straps sandwiched between the wing-grid spars and the upper composite wing skin, and
a second set of substantially flat straps sandwiched between the wing-grid spars and the lower composite wing skin.

2. The aircraft wing of claim 1, further comprising:
the wing-grid spars bonded to each of the upper and lower composite wing skins such that the upper and lower composite wing skins and the wing-grid structure form a unitized bonded wing structure.

3. The aircraft wing of claim 1, wherein:
the upper composite wing skin has a stiffness less than the stiffness of the lower composite wing skin.

4. The aircraft wing of claim 1, wherein:
each of the upper and lower wing skins is orthotropic and comprises a respective interlaminar fracture toughness, and
wherein the interlaminar fracture toughness of the upper composite wing skin is less than the interlaminar fracture toughness of the lower composite wing skin.

5. The aircraft wing of claim 4, wherein:
the upper composite wing skin has an interlaminar fracture toughness in Mode I of between approximately 3.0 in-lbs/in$^2$ and approximately 5.0 in-lbs/in$^2$, and
the lower composite wing skin has an interlaminar fracture toughness in Mode I between approximately 4.5 in-lbs/in$^2$ and approximately 6.5 in-lbs/in$^2$.

6. The aircraft wing of claim 4 wherein the upper and lower composite wing skins having at least one differing characteristic selected from a group comprising:
fiber orientation,
fiber material,
fiber diameter,
fiber density,
resin material,
number of plies having a fiber orientation of 0 degrees.

7. The aircraft wing of claim 1, wherein:
each of the wing-grid spars includes a pair of spar caps and a spar web connected between the spar caps, and
the grid cross beams include cross beam webs coupled with the spar webs.

8. The aircraft wing of claim 1, wherein:
each of the wing-grid spars including an upper cap bonded to the upper composite wing skin and a lower cap bonded to the lower composite wing skin.

9. A unitized composite aircraft wing, comprising:
an upper composite wing skin comprising multiple laminate plies of fiber reinforced resin and having a first interlaminar fracture toughness;
a lower composite wing skin comprising a plurality of laminated plies of fiber reinforced resin and comprising a second interlaminar fracture toughness that is greater in magnitude than the first interlaminar fracture toughness; and
a composite grid structure sandwiched between and bonded to each of the upper and lower composite wing skins, the composite grid structure including a plurality of composite wing-grid spars extending in a span-wise direction of the wing, and a plurality of composite grid cross beams cocured with the wing-grid spars and extending in a chord-wise direction of the wing, such that the composite wing-grid spars are bonded to the upper and lower composite wing skins to form a unitized wing structure, and the grid cross beams comprise first and second sets of substantially flat composite straps respectively sandwiched between the wing-grid spars and the upper and lower composite wing skins.

10. The unitized composite aircraft wing of claim 9, wherein each of the wing-grid spars includes an I-beam having an upper cap bonded to the upper composite wing skin, a lower cap bonded to the lower composite wing skin and a web connecting the upper and lower caps.

11. The unitized composite aircraft wing of claim 9, further comprising
the first interlaminar fracture toughness in Mode I of between approximately 3.0 in-lbs/in$^2$ and approximately 5.0 in-lbs/in$^2$, in Mode II of between approximately 4.5 in-lbs/in$^2$ and 7.0 in-lbs/in$^2$, and in Mode III of between approximately 7.5 in-lbs/in$^2$ and 8.5 in-lbs/in$^2$, and
the second interlaminar fracture toughness in Mode I between approximately 4.5 in-lbs/in$^2$ and approximately 6.5 in-lbs/in2, in Mode II of between approximately 5.5 in-lbs/in$^2$ and 8.0 in-lbs/in$^2$, and in Mode III of between approximately 8.5 in-lbs/in$^2$ and 12.0 in-lbs/in$^2$.

12. The unitized composite aircraft wing of claim 9, wherein:
each of the wing-grid spars has a grid spar web,
each of the grid cross beams has a cross beam web, and
the grid spar webs are connected to the cross beam webs.

13. The unitized composite aircraft wing of claim 9, wherein each of the wing-grid spars includes:
a central web,
upper and lower caps respectively on opposite ends of the central web,
side webs spaced from and extending generally parallel to the central web,
a center stiffener connected to the central web and extending between the side webs.

14. The unitized composite aircraft wing of claim 13, wherein the center stiffener extends between and structurally connects the grid spars.

15. A method of making an aircraft wing structure, comprising:
forming an upper composite laminate wing skin and a lower composite laminate wing skin each skin comprising differing stiffnesses from the other skin;
forming a composite wing-grid structure; and
bonding the composite wing-grid structure to the upper and lower composite wing laminate skins such that the composite wing-grid comprises:
wing-grid spars bonded to the upper and lower composite wing skins, thus forming a unitized wing structure; and
grid cross beams comprising first and second sets of substantially flat composite straps respectively sandwiched between the wing-grid spars and the upper and lower composite wing skins.

16. The method of claim 15, wherein forming the wing-grid structure includes:
forming a plurality of composite wing-grid spars,
forming a plurality of composite grid cross beams, and
bonding the composite wing-grid spars to the composite grid cross beams.

17. The method of claim 15, wherein forming the upper and lower composite laminate wing skins includes selecting at least one material characteristic that results in the upper composite laminate wing skin having an interlaminar fracture toughness that is less than the interlaminar fracture toughness of the lower composite laminate wing skin.

18. The method of claim 17, wherein the material characteristic is selected from the group consisting of:
fiber orientation,
fiber material,
fiber diameter,
fiber density,
resin material,
number of plies having a fiber orientation of 0 degrees.

19. The method of claim 15, wherein:
forming the upper composite laminate wing skin includes selecting an interlaminar fracture toughness in Mode I for the upper composite laminate wing skin that is between approximately 3.0 in-lbs/in$^2$ and approximately 5.0 in-lbs/in$^2$, and
forming the lower composite laminate wing skin includes selecting an interlaminar fracture toughness in Mode I for the lower composite laminate wing skin that is between approximately 4.5 in-lbs/in$^2$ and approximately 6.5 in-lbs/in$^2$.

20. The method of claim 15, wherein:
forming the grid structure includes forming wing-grid spars each having a web and upper and lower caps, and bonding the wing-grid structure to the upper and lower composite laminate wing skins includes bonding the upper and lower caps of each of the wing-grid spars respectively to the upper and lower composite laminate wing skins.

21. The method of claim 15, wherein:

forming upper and lower composite laminate wing skins includes cocuring each of the composite laminate wing skins, forming the composite wing-grid structure includes cocuring a grid of composite structural members, and bonding the wing-grid structure to the upper and lower composite laminate wing skins includes bonding the upper and lower composite laminate wing skins to the grid of composite structural members.

* * * * *